(12) United States Patent
Nitta et al.

(10) Patent No.: US 7,909,232 B2
(45) Date of Patent: Mar. 22, 2011

(54) MOLD AND METHOD OF MANUFACTURING THE SAME

(75) Inventors: Masahiro Nitta, Fukuyama (JP);
Masayuki Mito, Fukuyama (JP);
Ryoichi Ikeo, Kanzaki (JP); Takeshi Shinoda, Nagoya (JP)

(73) Assignee: Nomura Plating Co., Ltd., Osaka (JP)

( * ) Notice: Subject to any disclaimer, the term of this patent is extended or adjusted under 35 U.S.C. 154(b) by 110 days.

(21) Appl. No.: 12/392,485

(22) Filed: Feb. 25, 2009

(65) Prior Publication Data

US 2009/0159644 A1 Jun. 25, 2009

Related U.S. Application Data

(63) Continuation of application No. 10/555,001, filed on Dec. 1, 2005, now abandoned, which is a continuation of application No. PCT/JP2004/006431, filed on May 6, 2004, now abandoned.

(30) Foreign Application Priority Data

May 6, 2003 (JP) ................................ 2003-128326

(51) Int. Cl.
*B23K 20/12* (2006.01)
*B22D 11/00* (2006.01)
(52) U.S. Cl. ..................... 228/114.5; 164/418
(58) Field of Classification Search .................. 164/418, 164/91; 228/114.5
See application file for complete search history.

(56) References Cited

U.S. PATENT DOCUMENTS 4,949,773 A * 8/1990 Nomura et al. ................. 164/91

FOREIGN PATENT DOCUMENTS

| JP | 51-22651 | | 2/1976 |
| JP | 61-176445 | | 8/1986 |
| JP | 64-5739 | | 1/1989 |
| JP | 64-39831 | | 3/1989 |
| JP | 64-39831 U | * | 3/1989 |
| JP | 3-258440 | | 11/1991 |
| JP | 11-028584 | | 2/1999 |
| JP | 2000-326053 | | 11/2000 |
| JP | 2003-311438 | | 11/2003 |

OTHER PUBLICATIONS

International Search Report issued Aug. 24, 2004 in the International (PCT) Application No. PCT/JP2004/006431.

* cited by examiner

*Primary Examiner* — Kevin P Kerns
(74) *Attorney, Agent, or Firm* — Wenderoth, Lind & Ponack, L.L.P.

(57) ABSTRACT

A mold welded with a dissimilar metal member manufactured by pressingly bringing the dissimilar metal member into contact with a mold formed of copper or a copper alloy in a stationary state while rotating the dissimilar metal member at a high speed, stopping the dissimilar metal member, and providing a forced pressure larger than the pressure in the first step to the mold. The present mold solves the problems of efficient cooling and attachment of back frame. Also, a variety of problems including cutting processing loss of copper or copper alloy plate, long processing times, heat distortion and heat deterioration of copper plates, etc, can be solved. Further, welding position precision and welding strength of stud bolts can be improved. Finally, the invention concerns a mold welded with a dissimilar metal member where the mold is manufactured by the first step shown above.

13 Claims, 5 Drawing Sheets

Fig.1
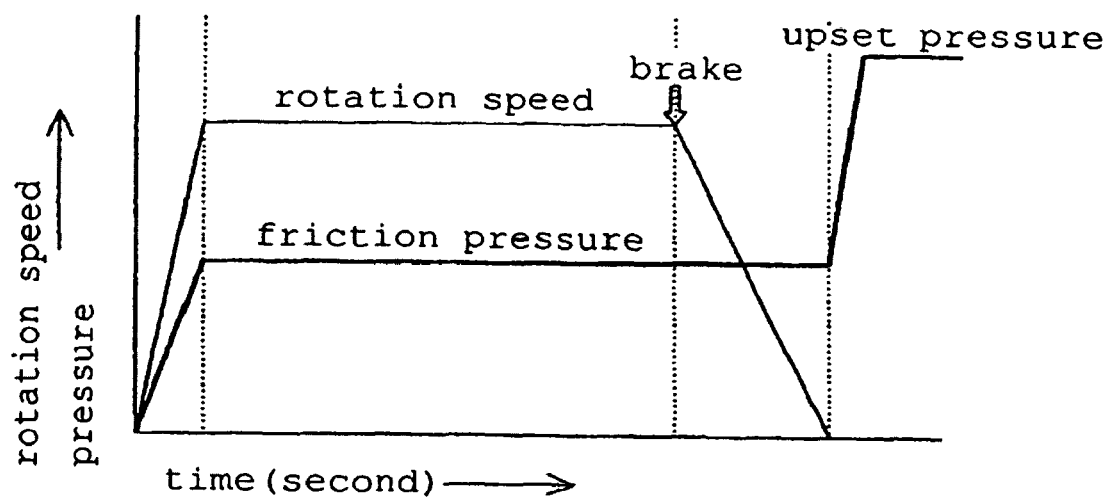
Fig.2 PRIOR ART
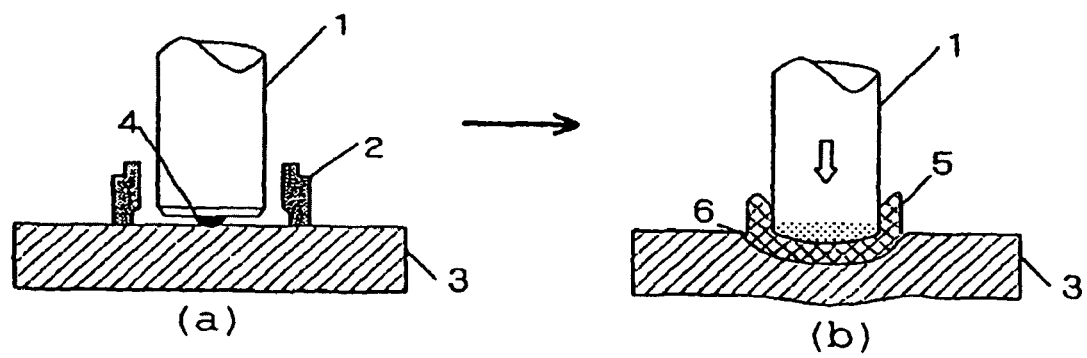
(a)　　　　　　　　(b)

Fig.3  PRIOR ART
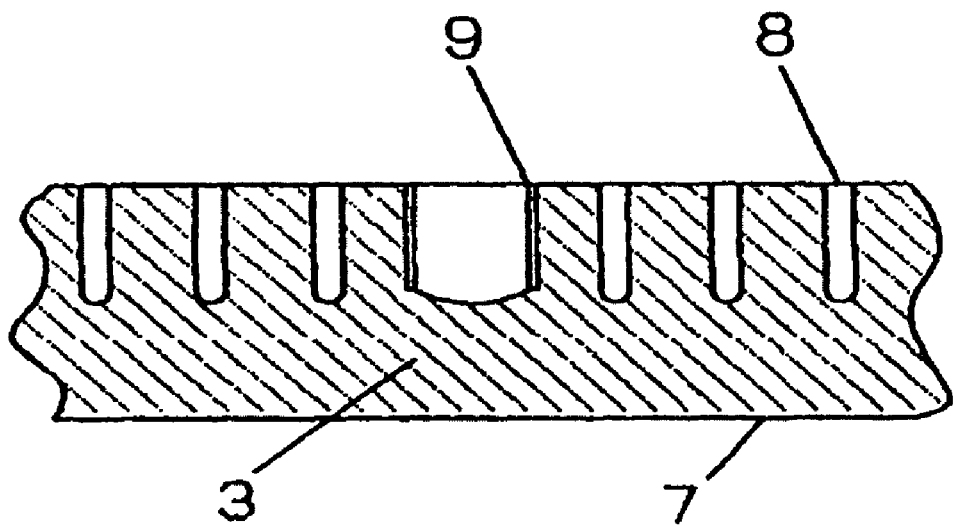
Fig.4  PRIOR ART
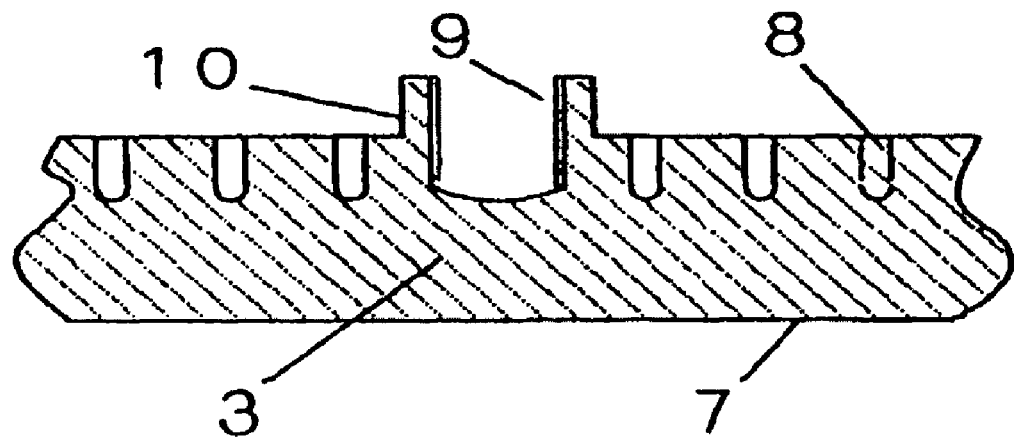

MOLD AND METHOD OF MANUFACTURING THE SAME

This application is a continuation of Ser. No. 10/555,001, filed Dec. 1, 2005, now abandoned, which is a 371 U.S. national stage of International Application No. PCT/JP2004/06431 filed May 6, 2004, incorporated by reference in their entirety.

FIELD OF THE INVENTION

The present invention relates to a mold which is welded with a dissimilar metal member and is formed of a copper or a copper alloy as a base metal, and a method of manufacturing the same.

BACKGROUND ART

Conventionally, in the field of iron and steel industry, molten steel reaching to about 1500° C., which has been taken out from a steel making furnace such as a converter, an electric furnace or the like, is serially sent to a casting mold made of copper or a copper alloy having a cooling mechanism on the back face (rear face) via ladle, tundish and tundish nozzle, while reducing the temperature by bringing the molten steel into contact with the mold wall, is discarded in a lower direction while it gradually forms a thick solidification shell and is allowed to make a slab which is serially formed and has a certain size. Furthermore, subsequently, it is sent to the tall end processes such as heating, rolling and the like and then, it is made into a product via cutting off process. Copper or a copper alloy having a high thermal conductivity is usually utilized for such continuous casting mold material for steel, since it has an important function for reducing the temperature from the molten steel.

As described above, although it is needless to say with respect to the contact surface with the molten steel of a mold that the considerations on an effect of reducing the temperature by utilizing copper or a copper alloy having a high thermal conductivity as a material and so on have been done. However, the surface hardening accompanying with the growth of solidification of the molten steel has been progressed, and since the copper member is weared by such surface hardening and the like, a surface cracking which is called as a star crack is occurred by mixing copper into the slab, the prevention of the damage to the slab occurring by utilizing copper as well as the countermeasures of the wear have been conventionally carried out by coating nickel, nickel-cobalt alloy, nickel-iron alloy, nickel-chromium alloy or the like on the contact surface with the molten steel in the mold, using a method of plating, a method of thermal spraying or the like.

With respect to a cooling mechanism installed at the back face of a continuous casting mold, it has a structure in which a back frame (water box) has been attached on the anti-molten steel contact surface of the casting mold as shown in FIG. 7. For example, as shown in FIG. 3, it had a structure in which a hole for a back frame mounting member and a cooling groove for enhancing the cooling efficiency have been also provided on the mold itself. It is natural that the shape and the number of such grooves are accompanied by some changes depending on the conditions specific to the continuous casting machine, however, the thickness of the copper member or copper alloy member used for this casting mold is almost fixed basically in the range from 40 to 50 mm. It should be noted that in a part of the casting field, a continuous casting machine having a so-called electromagnetic stirring function, i.e. the stirring function of the molten steel within the mold by electromagnetic force, has been employed for the purpose of contemplating the improvement of central segregation of the slab and the solidification structure and making the slab with a higher quality, and in recent years, its use has been increased.

The casting mold which is used in a continuous casting machine with an electromagnetic stirring function is often set in a thinner mold than the usual mold, and the thickness of copper member or a copper alloy member is often set in the range from about 25 to about 30 mm for the purpose of enhancing permeability and because the temperature of the casting upper portion is tended to rise by the effect of the molten steel stirring within the mold. Therefore, a certain device is also made to the back frame, however, the thinning of the copper member or the copper alloy member makes it difficult to provide a hole into which the back frame is to be mounted.

Furthermore, in an example of a casting mold which is used in some continuous casting machines with an electromagnetic stirring function, such mold employs a structure in which the back frame is mounted by welding pieces of stud bolts made of stainless steel in a pitch range from 150 to 200 mm by an arc stud welding method as it is in a state of flat surface without providing a cooling groove on the back face from the first. The arc stud welding method is a method wherein a base metal and a portion of stainless steel are melted and welded by generating an arc under the direct current electric source. However, since the object matter (base metal) is copper or an alloy made with copper which has a high thermal conductivity, and since the object matter (base metal) has a heat discharging volume much larger than the stud bolt (made of stainless steel) which is to be welded, it must be said that highly excessive heat input is applied from the viewpoint of the welding conditions. As a result of this, it is difficult to avoid that the material is subjected to the influence of the heat over the wide zone. In addition to this, in this process, it requires a ring made of ceramic in a cylinder shape which is called ferrule and having the all of functions of edge preparation of stud bolt edge, combination use of flux, dispersion prevention of the melted metal, and electric insulation, and thus the welding operation becomes complex and troublesome. Moreover, the casting mold in which the required number of stud bolts have been welded accompanies the variation of 1.6 mm or the like from the viewpoint of a perpendicular degree to the mold copper member, and in addition to the problem of preciseness of mounting stud bolt, it often shows such defects that the heat deformation and strength deterioration of the copper plate, the cracking of the copper member at a higher or lower temperature of the welding portion between the copper plate and stud bolt occur, and the melted slag remains without being completely exhausted from the welded portion between the copper plate and stud bolt. These complex factors require, in some cases, re-welding working, and cause bolt broken incident at the time of back frame assembling, and further, bolt breakage incident by various kinds of action stresses during the mold operation and the like. In FIG. 2(a) and FIG. 2(b), the states of before the arc stud welding is performed and after the arc stud welding has been performed is shown in a summary diagram.

Furthermore, as an embodiment of mold which is utilized in a continuous casting machine accompanied with another electromagnetic stirring function as shown in FIG. 4, there is also exemplified such an example having a structure wherein only the copper member of the back frame attachment portion is thicker, a back frame attachment seat is provided by performing the screw hole processing to the structure which has been made thicker and further, a cooling groove is provided by performing the cutting processing. In such an example, there is no heat input accompanied with an arc stud welding, and there is also no fear about the raw material deformation and strength deterioration since the back frame mounting seat in a cylindrical shape is provided on the rear surface of the copper member, and cooling grooves at other sites except for the rear surface are processed. On the other hand, it cannot help becoming a complex processing of the processing of mounting seat, the processing of back frame mounting hole (screw hole processing and tapp for HELI-COIL insert (hereinafter, referred to as helisert) made of stainless steel mounting) and the like. Further, 40 to 50% by weight of the original copper or copper alloy member is actually cut and removed by this serial mechanical processing. The cut pieces will be utilized in any way as refreshable scraps, however, it accompanies the occurrence of a large amount of industrial waste.

As described above, in the case of a conventional casting mold, for the purpose of setting the back frame mounting hole and imparting the function of efficient cooling, the processing such as the processing of mounting hole, the fitting of a helisert made of stainless steel for the purpose of enhancing and protecting a screw thread, and further the processing of a cooling groove which is to be a pathway of cooling water and the like is performed on the back face of the thick copper member. On the other hand, in a casting mold in the casting machine having the conventional electromagnetic stirring function, there is used an arc stud welding method in which there are many problems in view of heat deformation of the material, strength deterioration, welding defects, welding position preciseness and the welding strength, or there is performed the processing of back frame mounting seat, the attachment of tapp for HELI-COIL insert (hereinafter, referred to as helisert) made of stainless steel, the processing groove or the like which is accompanied with a long time processing and the material loss from the thick copper member. In this way, it is understood that the technical problems common to the conventional anti-molten steel contact surface (rear surface) of steel continuous casting mold are largely summarized to two problems of efficient cooling and the mounting of back frame. More concretely, solution of the various problems such as improvements in cutting processing loss of copper member or a copper alloy member, long time of processing, precision of welding position with respect to copper member or a copper alloy member, reliability of welding strength, and heat deformation and heat deterioration of copper member and the like, contributes to the saving of the resources, the reduction of industrial waste, the shortening of the processing time, and the enhancement of the reliability in the welding between the copper alloy member and stud bolt, therefore, which contribution is enormous to the industries.

Moreover, a large problem of the casting mold in which the conventional general cooling groove is provided by performing the cutting processing is in that from the necessity of providing a mounting hole for the purpose of mounting the back frame on the side of the copper plate, the copper plate is confined to a thicker one and the use of the thicker copper plate causes the processing of a cooling groove. If a novel method of mounting a back frame which solves such a problem is found, the thinning of the copper plate and the processing of a cooling groove themselves can be made null, the problem of the copper plate used for the electromagnetic stirring of a method in which the thicker copper plate is still used for the purpose of providing a back frame mounting seat is also solved.

Moreover, in the case of the mold copper plate for electromagnetic stirring which utilizes an arc stud welding method of stud bolt, if a stud bolt welding method which can improve the welding position precision and the welding strength as well as the heat deformation and heat distortion of the copper plate can be suppressed is found, the position leveling of bolt, stud bolt breakage incident and the like can be avoided.

SUMMARY OF THE INVENTION

Therefore, the present invention is to provide a mold for solving the problems of efficient cooling and mounting of back frame, and more concretely, to provide a mold for solving the problems such as improvements in cutting processing loss of a copper member or a copper alloy member, a large amount of the processing time period, reliability of the welding position precision and the welding strength of stud bolts, heat deformation and heat deterioration of the copper member and the like.

In order to solve the above problems, the present inventors have investigated various studies by means of trial and error. As a result of these studies, the present inventors have succeeded in producing a mold welded with a dissimilar metal member, characterized in that the mold is manufactured by a method comprising a first step for pressingly bringing the dissimilar metal member into contact with a mold formed of copper or a copper alloy in a stationary state while rotating the dissimilar metal member at a high speed, a second step for stopping the dissimilar metal member, and a third step for providing a forced pressure larger than the pressure in the first step to the mold. Thus, the present inventors have found that the present invention can solve the various problems such as cutting process loss of a copper member or a copper alloy member, a large amount of processing time period, reliability of the welding position precision and the welding strength of stud bolt, heat deformation, heat deterioration of the copper member and the like, that is, the above-described problems are solved at once.

After the present inventors have acquired such various findings, they further studied intensively and completed the present invention.

Specifically, the present invention relates to:

(1) a mold welded with a dissimilar metal member characterized in that the mold is manufactured by a method comprising a first step for pressingly bringing the dissimilar metal member into contact with a mold formed of copper or a copper alloy in a stationary state while rotating the dissimilar metal member at a high speed, a second step for stopping the dissimilar metal member, and a third step for providing a forced pressure larger than the pressure in the first step to the mold, (2) the mold according to the above (1), characterized in that the mold is a steel continuous casting mold, (3) the mold according to the above (1) or (2), characterized in that the dissimilar metal member is a back frame mounting member, (4) the mold according to the above (3), characterized in that the back frame mounting member is equipped with a screw structure for interiorly mounting the back frame, (5) the mold according to the above (2), characterized in that the steel continuous casting mold is a steel continuous casting mold for electromagnetic stirring, (6) the mold according to the above (1), characterized in that main rotation speed of the dissimilar metal member of the first step is 60 m/min or more, the pressure is 40 MPa or more, and the forced pressure of the third step is 60 MPa or more, (7) the mold according to the above (1), characterized in that the dissimilar metal member comprises a stainless steel, titanium, a titanium alloy or a nickel alloy, (8) the mold according to the above (1), characterized in that when a mold and a dissimilar metal member are brought into contact with each other, a nickel plating layer or a nickel alloy plating layer, or a nickel foil or a nickel alloy foil is intervened between the mold surface and the dissimilar metal member surface.

(9) the mold according to the above (8), characterized in that the thickness of a plating layer or a foil is in the range from 1 to 50 μm,

(10) a method of manufacturing a mold welded with a dissimilar metal member characterized in that the method comprises a first step for pressingly bringing the dissimilar metal member into contact with a mold formed of copper or a copper alloy in a stationary state while rotating the dissimilar metal member at a high speed, a second step for stopping the dissimilar metal member, and a third step for providing a forced pressure larger than the pressure in the first step to the mold,

(11) a method of manufacturing a mold welded with a dissimilar metal member, characterized in that while performing pressure welding of the mold and the dissimilar metal member, said mold and mold metal member are subjected to solid state welding by friction heat generated by the difference of both main spindle rotation speeds,

(12) the method of manufacturing according to the above (11), characterized in that the surface area of welding surface including welding site of a mold which consists of copper or a copper alloy is 100-fold or more of the welded area of a dissimilar metal member,

(13) a steel continuous casting mold in which a back frame mounting member welded by friction welding, and

(14) the method of manufacturing according to the above (1), characterized in that the forced pressure of the third process is 2 to 3-fold of the pressure of the first process.

BRIEF DESCRIPTION OF THE DRAWINGS

FIG. 1 shows a sequence of friction welding in the present invention.

FIG. 2 is a drawing illustrating a conventional arc stud welding method, wherein (a) shows the state before the arc stud welding, and (b) shows the state after the arc stud welding.

FIG. 3 is a cross sectional plan view of a conventional general casting mold.

FIG. 4 shows an embodiment of a conventional casting mold for electromagnetic stirring.

Figure 5:
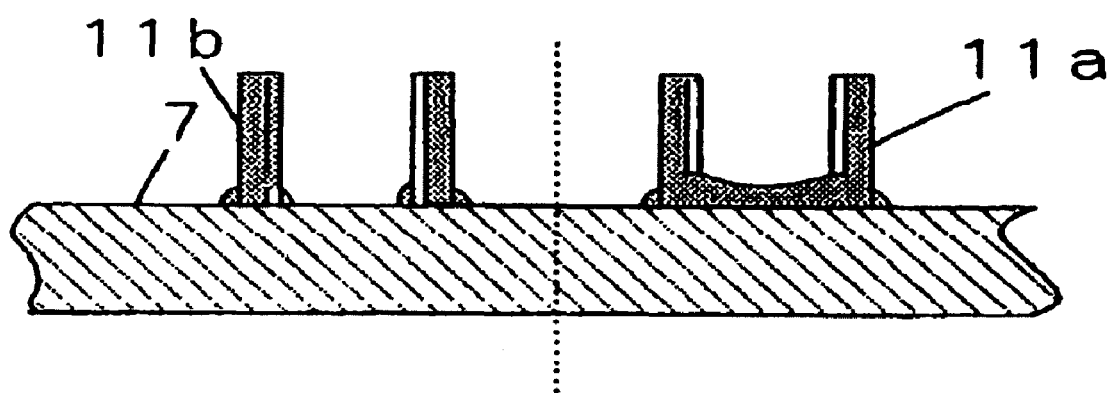
FIG. 5 is a schematic view showing a mold of the present invention.

In the Figures, the numeral 1 denotes stud bolt, the numeral 2 denotes ferrule, the numeral 3 denotes copper or a copper alloy, the numeral 4 denotes flux, the numeral 5 denotes excess metal portion, the numeral 6 denotes heat-affected zone, the numeral 7 denotes molten steel contact surface, the numeral 8 denotes cooling groove, the numeral 9 denotes back frame mounting hole, the numeral 10 denotes back frame mounting seat in a cylindrical shape, the numeral 11a denotes boss made of stainless steel, the numeral 11b denotes boss made of stainless steel, the numeral 12 denotes back frame and the numeral 13 denotes casting mold.

BEST MODE FOR CARRYING OUT THE INVENTION

The present invention relates to a mold welded with a dissimilar metal member, characterized in that the mold is manufactured by a method comprising a first step for pressingly bringing the dissimilar metal member into contact with a mold formed of copper or a copper alloy in a stationary state while rotating the dissimilar metal member at a high speed, a second step for stopping the dissimilar metal member, and a third step for providing a forced pressure larger than the pressure in the first step to the mold.

The present inventors have compared and investigated a variety of casting molds. As a result of the investigation, the present inventors have noticed that if different materials, for example, such as stainless steel material or the like are able to be welded with a great strength without heat deterioration of the material to copper and its alloy material which is excellent in thermal conductivity, instead of working in providing hole for back frame which is common to many casting molds, various general problems over the casting mold can be solved at once, and a novel casting mold can be provided. Then, the present inventors have compared and studied in detail methods of welding various materials including welding again. First, as a method of welding that the present inventors have investigated, there are exemplified arc welding with covered electrode, gas shield arc welding with consumable electrode, self-shield arc welding, submerged arc welding, electroslag welding, electrogas arc welding, stud welding, electron beam welding, laser welding, magnetic drive arc welding, oxygen-acetylene welding, and the like, and the present inventors have studied a variety of such welding methods. However, most of the welding methods are welding methods that are largely affected by heat, or are applied in a special required atmosphere, and thus these methods could not essentially solve the problem.

Then, the present inventors have paid attention to the potentiality of friction welding as a solid state welding method that were capable of automating and mechanizing the welding from about the middle of 1960s, the heat-affected zone is extremely limited and it is expected that only the welded surface are exothermic, and investigated the potentiality of application of welding method to copper plate, stainless steel member and titanium member. When welding combinations through friction welding are taken into consideration, in any case, aluminum and its alloy, copper and its alloy, carbon steel, alloy steel, stainless steel and the like are classified in the welding possible zone with respect to copper or a copper alloy. However, as a practical problem, there has been no example that a material having an excellent thermal conductivity and a large volume, and a dissimilar material having an extremely small volume are practically used, and casting mold is just the case. Specifically, in the casting mold, there is too much difference of size for the viewpoint of volume between the metal member to be welded and the dissimilar metal member, and the mold member itself becomes an excellent efficient heat discharging plate. Therefore, even if the welding itself between metal member and dissimilar metal member could be carried out, it was feared that the contents of the welding from the viewpoint of welding strength and the like could not be satisfied. Practically, a preliminary test was performed wherein stainless rod as a welding member, and copper rod having approximately the same size as a member to be welded are welded, revealing that the welding itself was possible. Then, when the copper rod was changed into a copper plate having a size of 150 mm square×25 mm thickness, and the stainless rod was changed into a stainless rod having a diameter of 14 mm, the welding test was continued. As the present inventors have feared, a zone having voids and not having been welded in the welding interface zone over wide range has been generated. Moreover, the formation of the mixed layer of the stainless steel and copper in the vicinity of the interface was not enough, too, and an excellent welding strength could not be expected. However, since the welding was attained even though it was partial, it is expected that there is a possibility of welding, and then a welding test at full scale using the combination between chromium/zirconium copper member and SUS304 member was started. As a result of this test, the present inventors have found that in order to obtain the stable and strong welding, three conditions including friction pressure, rotation speed of the main spindle, and forced pressure (hereinafter, referred to as upset pressure) are dominant in the welding. Further, the present inventors have found that when the welding is performed via a first step of contact under a pressure while rotation at a high speed, a second step of stopping the high speed rotation, and a third step of applying a forced pressure larger than the pressure in the first process, the welding is excellent and satisfactory. Further, the present inventors have found that in the case where the conditions in each step are such that friction pressure is about 40 MPa or more, upset pressure is about 60 MPa or more, and main spindle rotation speed is about 60 m/mm or more, a preferred welding showing a welding strength stronger than the tensile strength of the copper plate. It should be noted that the present inventors have found that it is preferred that the main spindle rotation speed is about 2000 rpm or more.

Furthermore, the present inventors have found that if the setting is within the above-described conditions, the setting of conditions exceeding over or largely exceeding over the friction pressure of about 40 MPa, upset pressure of about 60 MPa and the main spindle rotation speed of about 60 m/min can provide quality level without any problem from the viewpoint of welding strength and interface structure. Specifically, the present inventors have found that the more the number of the above-described three conditions is made larger (made conditions severe), the more burr generation volume accompanied with friction welding tends to be increased. However, since such level of welding strength is saturated, there is not any meaning except that an excellent welding and the like are obtained as described above even if the excessive severe conditions are set. Furthermore, the present inventors have found that by performing an experiment using a stainless steel, and further by performing an experiment using a titanium member as a dissimilar metal member instead of stainless steel member, a variety of tendencies seen in the stainless steel member concerning with the welding are also approximately the same with titanium member and the like.

Moreover, the present inventors have made various investigations for the purpose of enhancing interface heat input amount at the welding, making the welding more stable, and improving the welding strength. As a result, in the case where a copper plate and a rod made of stainless steel are welded by the above-described friction pressure method by covering nickel, nickel alloy or the like which is inferior to copper in view of thermal conductivity, on the side of the copper plate or in the vicinity of the point of the stainless steel, or by interposing a foil such as the nickel member or nickel alloy plate, the rise of friction torque can be seen, the interface heat input efficiency at the time of welding can be enhanced, and the welding can be made more stable, which is useful for achieving the above-described object and the like. Furthermore, the present inventors have found that in order to obtain more preferable results, it is preferred that the thickness of coating or foil is in the appropriate range, it is preferred that the thickness of coating or foil is in the range from about 1 to 50 μm and it is more preferable that it is in the range from about 2 to 20 μm.

Moreover, the present inventors have found that from the viewpoint that change in color caused by heat on the periphery of the welding portion can be avoided, the plating on the side of copper plate is more preferred than the plating (covering nickel or nickel alloy) on the side of stainless steel (in the vicinity of the tip part of rod made of stainless steel). However, it has been found that the effect from the viewpoint of strength obtained by interposing nickel or its alloy intermediately was not seen so much compared to the case where these are not interposed, and intensiveness of the variation of the welding strength was seen. The present inventors have found that for example, the welding strength at the time when the welding strength at the copper plate and rod made of stainless steel were welded without interposition of the foil such as nickel, its alloy or the like are varied from 50 to 60 MPa even if these are welding conditions described above, and to the contrary, at the time when the copper plate and rod made of stainless steel are interposed, it is possible that the variation range is made narrower to 20 to 30 MPa and the like. Thereafter, based on these findings, the present inventors have found that the variation of the welding strength can be made narrower by interposing the foil such as nickel, its alloy or the like at the time of the above-described welding.

A preferred embodiment of the present invention will be described below with reference to FIG. 1.

The welding of the mold and a dissimilar metal member is achieved by (a) fixing the mold and gradually raising the main spindle rotation speed of the dissimilar metal member, (b) maintaining the main spindle rotation speed of dissimilar metal compound at the time when the main spindle rotation speed has reached to the desired value, (c) bringing the dissimilar metal compound into contact with the mold under the pressure for a desired time period, thereby to generate the friction heat, (d) reducing the main spindle rotation speed of the dissimilar metal member using a brake while maintaining the pressure, and (e) applying the desired above-described upset pressure.

In short, the gist of the present invention resides in that the mold and the dissimilar metal member are subjected to solid state welding, using the friction heat generated by the difference of both main spindle rotation speeds in the state where the mold and the dissimilar metal member are welded.

Although the copper alloy which is used in the present invention is not particularly limited, a conventional alloy in this technical field is appropriately used. For example, there are exemplified a copper plate for a mold, obtained through precipitation hardening by the addition of chromium/zirconium (for example, Cr: 0.5-1.5% by mass, Zr: 0.08-0.30% by mass, and the remaining portion: Cu), and a chromium/zirconium/aluminum addition copper plate for a mold with electromagnetic stirring (for example, Cr: 0.50-1.50% by mass, Zr: 0.08-0.30% by mass, Al: 0.7-1.1% by mass, and the remaining portion: Cu) and the like.

Referring to the dissimilar metal member which is used in the present invention, any species is available if it is a metal except for copper or a copper alloy, and it may include aluminum or its alloy, carbon steel, alloy steel, and stainless steel, and the like, however, preferable examples of such dissimilar metal members are stainless steel, titanium, a titanium alloy or a nickel alloy. Moreover, according to the present invention, it is preferable that the above-described dissimilar metal member is a back frame mounting member, and that the back frame mounting member is one in which a screw structure for mounting the back frame has been interiorly provided.

The preferable kinds and conditions of nickel plating solution (bath) are listed below.

As a plating solution for obtaining nickel, there are many plating solution, for example, a Watt's bath, a borofluoride bath, a sulfate bath with high concentration, a sulfamate bath, a nickel ammonium chloride bath, a nickel ammonium sulfate bath and the like, and all of these can be utilized, however, most of the baths are bad in working efficiency and strong in toxicity, and most preferable bath is a Watt's bath and a sulfamate bath.

| (1) Watt's bath | |
|---|---|
| pH | 3-5 |
| nickel sulfate (6H$_2$O) | 230-360 g/L |
| nickel chloride (6H$_2$O) | 20-60 g/L |
| boric acid | 25-45 g/L |
| anti-pitter | used in combination if required |
| brightener | not used |
| current density | 1-6 A/dm$^2$ |
| temperature | 40-70° C. |
| agitation | air agitation |

| (2) sulfamate bath | |
|---|---|
| pH | 3-5 |
| nickel sulfamate (4H$_2$O) | 300-600 g/L |
| nickel chloride (6H$_2$O) | 0-30 g/L |
| boric acid | 25-45 g/L |
| anti-pitter | 0.3-1.0 g/L |
| current density | 1-10 A/dm$^2$ |
| temperature | 30-60° C. |
| agitation | with or without pump agitation |

The kinds and appropriate conditions of nickel alloy plating solution will be described below.

As a nickel alloy plating, there can also be used a nickel-iron alloy, and a nickel-cobalt alloy.

(1) Example of Nickel-iron Alloy

| a. sulfamate bath | |
|---|---|
| pH | 1-3.5 |
| nickel sulfamate (4 H$_2$O) | 300-600 g/L |
| nickel chloride (6 H$_2$O) | 0-15 g/L |
| ferrous sulfamate | 0.5-10 g/L |
| sodium citrate | 10-30 g/L |
| boric acid | 25-45 g/L |
| sodium lauryl sulfate | 0.3-1.0 g/L |
| current density | 1-6 A/dm$^2$ |
| temperature | 40-60° C. |
| agitation | with or without pump agitation |

| b. sulfate bath | |
|---|---|
| pH | 1-4 |
| nickel sulfate (6 H$_2$O) | 80-250 g/L |
| nickel chloride (6 H$_2$O) | 40-60 g/L |
| ferrous sulfate (7 H$_2$O) | 1-40 g/L |
| sodium citrate | 2-20 g/L |
| sodium gluconate | 2-20 g/L |
| additive | 0.1-1 g/L |
| current density | 1-10 A/dm$^2$ |
| temperature | 45-65° C. |

(2) Example of Nickel-cobalt Alloy

| a. sulfamate bath | |
|---|---|
| pH | 3-5 |
| nickel sulfate (6 H$_2$O) | 100-200 g/L |
| cobalt sulfate (7 H$_2$O) | 50-150 g/L |
| nickel chloride (6 H$_2$O) | 15-40 g/L |
| boric acid | 25-45 g/L |
| sodium lauryl sulfate | 0.3-1.0 g/L |
| current density | 1-10 A/dm$^2$ |
| temperature | 45-60° C. |
| agitation | with or without agitation using a jet pump |

| b. sulfate bath | |
|---|---|
| pH | 3-5 |
| nickel sulfate (6 H$_2$O) | 100-200 g/L |
| cobalt sulfate (7 H$_2$O) | 50-150 g/L |
| nickel chloride (6 H$_2$O) | 15-40 g/L |
| boric acid | 25-45 g/L |
| anti-pitter | 0-20 mL/L |
| electric current density | 1-10 A/dm$^2$ |
| temperature | 40-60° C. |
| agitation | with or without pump agitation |

Examples of the steps for plating copper or copper alloy with nickel or a nickel alloy are described below.

(1) In order to plate nickel or nickel alloy on the side of a copper plate, the surface to be covered or the portion except for covering is masked by a paint having a chemical resistance or a tape, and after immersion degreasing, water washing, acid immersion, washing using water, and nickel plating or nickel alloy plating may be performed by the normal method. That is, after a commercially available degreasing agent 100HK (manufactured by Uken Industries Co., Ltd.) as an immersion degreasing solution is applied for 5 minutes at 60° C., followed by water rinsing, activation was performed by immersion in 98% sulfuric acid of 50 mL/L for 3 minutes at room temperature, water rinsing was again made, and then nickel plating is carried out. It should be noted that any one of plating solutions can be utilized, however, for example, nickel plating is carried out under the following conditions using Watt's bath:

| | |
|---|---|
| pH | 4.2 |
| nickel sulfate (6 H$_2$O) | 240 g/L |
| nickel chloride (6 H$_2$O) | 45 g/L |
| boric acid | 30 g/L |
| current density | 3 A/dm$^2$ |
| temperature | 50° C. |
| agitation | air agitation |

(2) On the other hand, when nickel plating is carried out on the side of stainless steel bolt or rod, the following step is employed. Specifically, after the rod is masked while leaving or not leaving the area in the vicinity of the welding surface of the stainless steel rod, immersion degreasing is first performed in the same manner as in copper member, and the rod is rinsed using water, and subsequently immersed in 37% hydrochloric acid solution of 500 mL/L for 5 minutes, followed by rinsing with water. Next, after a strike plating is carried out in a strike plating solution comprising nickel chloride (6 H$_2$O) of 200 g/L, 37% hydrochloric acid of 70 mL/L for 3 minutes at room temperature and at a current density of 5 A/dm$^2$, the rod is rinsed using water, and nickel plating is carried out under the same conditions with the copper member.

In the present specification, the symbol of "%" denotes "% by weight" unless otherwise specified.

Hereinafter, the detail of the contents of the welding test will be described with reference to Examples/Comparative Examples.

EXAMPLES

Example 1 and Comparative Example

As a chromium/zirconium copper, 150 mm square×25 mm thickness member selected from CCM-B made by Chuetsu Alloy Molder Industries Co., Ltd. (chemical component: Cu; >98.0% or more, Cr: 0.5-1.5%, Zr; 0.08-0.30%) was prepared, and it was set on the fixed side. For movable side, a rod member made of SUS304 corresponding to stud bolt was selected, and a rod having the size of 14 mm diameter×70 mm length was used. It should be noted that the pressure welding was repeated in the range of parameter conditions shown in Table 1. The representative sequence at the time of friction welding is shown in FIG. 1. The abstract from the test results is indicated in Table 2. From these results, the most preferable range for pressure welding conditions showed that the main spindle rotation speed is 130 m/min. or more, the friction pressure ($P_1$) is 60 MPa or more, the friction time ($t_1$) is in the range from 2 to 20 seconds, the upset pressure ($P_2$) after the main spindle rotation speed was made 0 m/min. by making the brake work is 150 MPa or more, and the upset maintaining time ($t_2$) is in the range of about 5 to 30 seconds. Also in the tensile test (universal tensile testing machine made by Shimadzu) and cross sectional micro-observation (optical microscope made by Olympus), the welding strength (tensile strength) of chromium/zirconium copper and stainless steel (SUS304) shows 400 N/mm² or more within the above-described appropriate conditions range, and also in the observation of the cross sectional micro-structure, the defects were not found, and it could be enough to be applied into practical use. For an excellent welding, it has been found that three factors of friction pressure, main spindle rotation speed, and upset (forced) pressure become the most largest factors. It should be noted that the data of No. 18 shown in Table 2 are the results of pressure welding test on a titanium rod having the same size instead of the rod made by SUS304. Furthermore, Table 3 indicates the effects at the time when nickel was intervened as a plating.

TABLE 1

Major conditions of friction welding

| Parameter | Setting conditions range |
|---|---|
| Friction pressure ($P_1$) | 20-100 MPa |
| Friction time ($t_1$) | 1-60 seconds |
| Upset pressure ($P_2$) | 50-300 MPa |
| Upset maintaining time ($t_2$) | 1-30 seconds |
| Main spindle rotation speed (N) | 40-260 m/min |

TABLE 2

Typical Conditions for friction welding and evaluation of welding strength and welding zone cross section

| | Friction welding conditions | | | | | Results of evaluation | | |
|---|---|---|---|---|---|---|---|---|
| No | $P_1$ (MPa) | $t_1$ (sec) | $P_2$ (MPa) | $t_2$ (sec) | N (m/min) | Tensile strength (N/mm²) | Section microscope | Special item |
| 1 | 20 | 5 | 50 | 10 | 80 | 78.5 | | |
| 2 | 40 | 5 | 50 | 10 | 80 | 117.7 | | |
| 3 | 60 | 5 | 50 | 10 | 80 | 201.0 | | |
| 4 | 80 | 5 | 50 | 10 | 80 | 196.1 | | |
| 5 | 60 | 10 | 50 | 10 | 80 | 220.7 | | |
| 6 | 60 | 20 | 50 | 10 | 80 | 205.9 | | |
| 7 | 60 | 10 | 100 | 10 | 80 | 364.8 | | |
| 8 | 60 | 10 | 200 | 10 | 80 | 374.6 | | |
| 9 | 60 | 10 | 300 | 10 | 80 | 379.5 | | |
| 10 | 60 | 10 | 200 | 10 | 130 | 578.6 | A | |
| 11 | 60 | 10 | 200 | 10 | 220 | 598.2 | A | |
| 12 | 60 | 10 | 200 | 10 | 260 | 588.4 | A | |
| 13 | 60 | 10 | 200 | 30 | 130 | 559.0 | A | |
| 14 | 60 | 10 | 200 | 10 | 40 | 117.7 | | |
| 15 | 60 | 10 | 50 | 10 | 220 | 152.0 | | |
| 16 | 60 | 2 | 150 | 10 | 130 | 551.2 | A | |
| 17 | 60 | 2 | 150 | 5 | 130 | 571.7 | A | |
| 18 | 60 | 2 | 150 | 5 | 130 | 589.2 | A | Titanium member |
| 19 | CCM-B (chromium/zirconium copper) (for comparison) | | | | | 372.7 | | |

Note)
any one of tensile strength indicated in Table 2 is the average value of number of repetition n = 5.
A: there is neither void, nor non-welded area, but stable mixed layer (Section microscopy observation)

TABLE 3

Nickel-interposition effect

| Conditions before welding of members | | Number of Tests | Welding conditions; $P_1$ ... 60 MPa $t_1$ ... 5 seconds $P_2$ ... 150 MPa $T_2$ ... 5 seconds N ... 130 m/min |
|---|---|---|---|
| On the side of copper | On the side of stainless steel rod | | |
| Plating but uncovered | Same with the left cell | 1 | 592 MPa |
| | | 2 | 481 MPa |
| | | 3 | 519 MPa |
| | | 4 | 491 MPa |
| | | 5 | 554 MPa |
| Nickel plating (5 μm) | Plating but uncovered | 1 | 593 MPa |
| | | 2 | 568 MPa |
| | | 3 | 588 MPa |
| | | 4 | 591 MPa |
| | | 5 | 590 MPa |
| Nickel plating (60 μm) | Plating but uncovered | 1 | 490 MPa |
| | | 2 | 484 MPa |

TABLE 3-continued

Nickel-interposition effect

| Conditions before welding of members | | Number of Tests | Welding conditions; $P_1$ ... 60 MPa $t_1$ ... 5 seconds $P_2$ ... 150 MPa $T_2$ ... 5 seconds $N$ ... 130 m/min |
|---|---|---|---|
| On the side of copper | On the side of stainless steel rod | | |
| | | 3 | 463 MPa |
| | | 4 | 478 MPa |
| | | 5 | 482 MPa |

Example 2

Examination Experiment of Heat Affection by Measuring Hardness of Copper Plate

Figure 6:
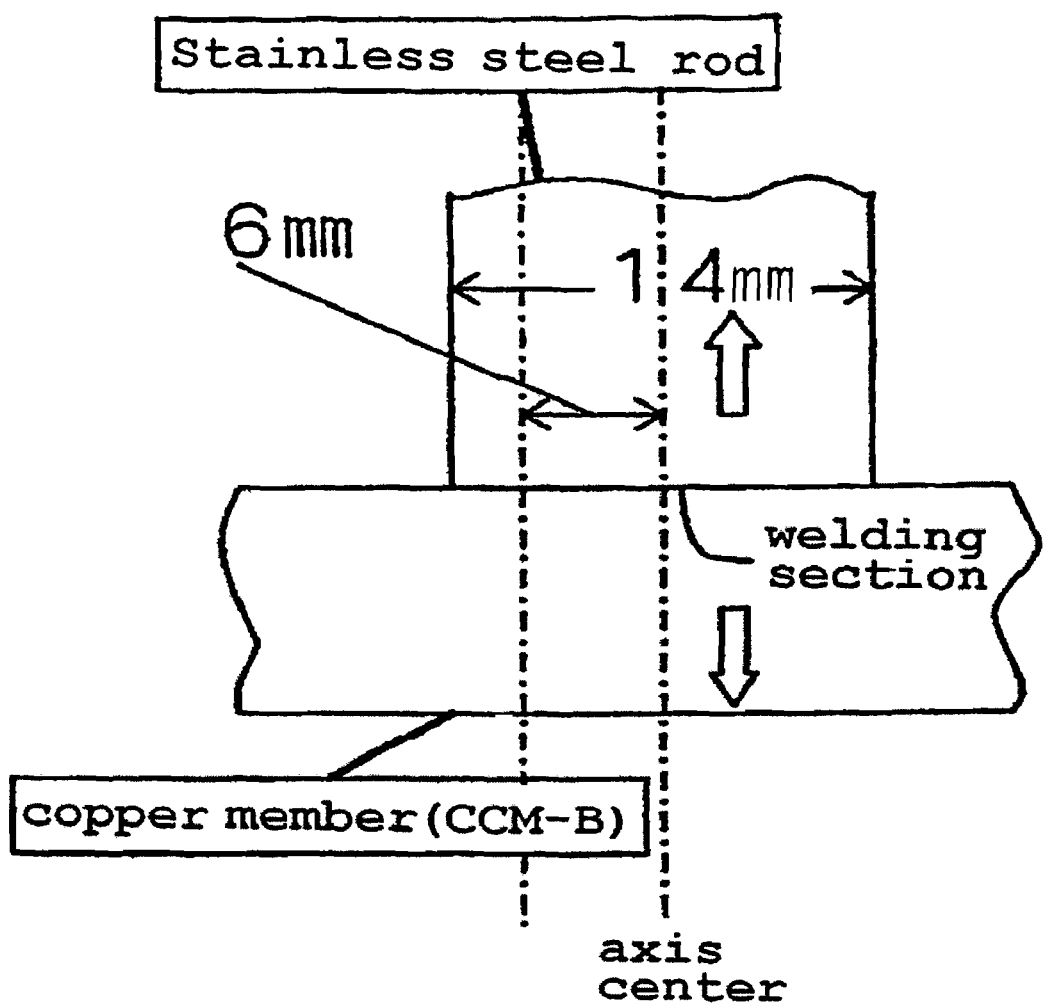
FIG. 6 shows hardness measurement sites of test pieces in Example 2.
Figure 7:
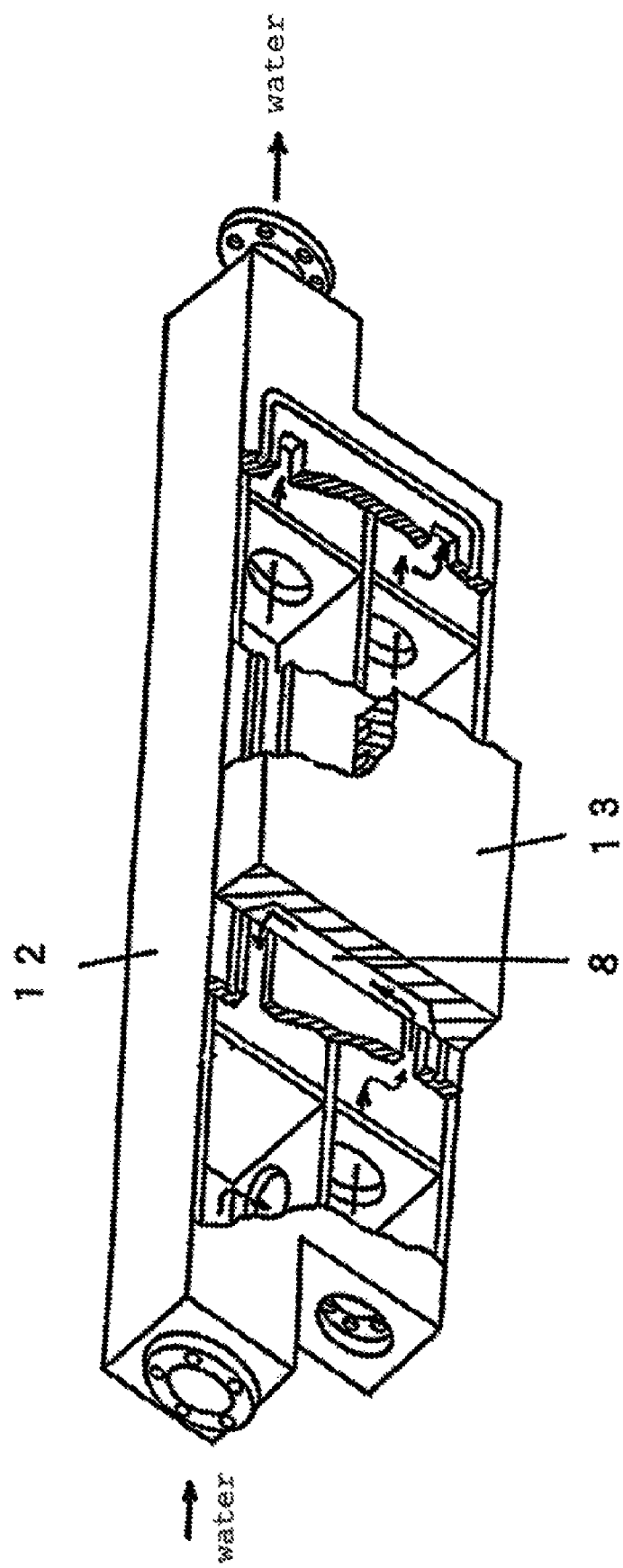
FIG. 7 is a perspective view showing the casting mold mounted on the back frame.

The welding test piece of No. 11 in Table 2 was cut off in the direction of axis, and the welding section is resin-encasulated according to the conventional method as shown in FIG. 6. Micro-Vickers hardness was measured at the site of the starting point and the place towards outside at 6 mm measured from the starting point by setting the welding section to the starting point, in the direction of stainless steel rod and in the direction of copper member, and by setting the shaft center to the starting point. The heat-affected zone of heat input at the time when the friction welding was carried out was extremely limited, and such heat-affected zones centralized to the welding zone are around 2.5 mm, respectively.

TABLE 4

Hardness in the vicinity of pressure welding zone (Unit; Hv)

| | Welding zone to copper member | | Welding zone to stainless steel | |
|---|---|---|---|---|
| | Center of axis | 6 mm from the center of axis | Center of axis | 6 mm from the center of axis |
| 0.2 mm | 102.5 | 100.8 | 165.6 | 162.4 |
| 1.0 mm | 98.3 | 99.7 | 222.1 | 223.7 |
| 1.5 mm | 110.4 | 109.8 | 239.1 | 256.1 |
| 2.0 mm | 132.2 | 122.5 | 261.3 | 270.8 |
| 2.5 mm | 137.6 | 121.9 | 272.1 | 298.1 |
| 3.0 mm | 135.9 | 138.3 | 280.6 | 302.9 |

However, the friction welding tests of Example 1 are only a kind of single pressure welding test of copper plate and stainless steel rod, respectively. In the case of the actual casting mold, there are a number of stud bolts or mounting holes with respect to one surface of mold piece. Then, we have decided that the simulation test in which its size is similar to the short side size for the actual slab is used was carried out, and this state will be described below in Example 3.

Example 3

Preparation of False-casting Mold

CCM-B (used in the fixed side) made of Chuetsu Metal Works Co., Ltd. whose sizes are 280 mm width, 800 mm length, and 25 mm thickness was prepared, and welded using laterally 3 rows and in the direction of length 9 rows of the stud bolts (used in the movable side) made of SUS304 whose sizes are 14 mm diameter and 65 mm length. The pressure welding conditions were set to the followings: main spindle rotation speed 130 m/min, contact pressure 60 MPa, friction time 5 seconds, upset pressure 150 MPa after setting the main spindle rotation speed to 0 m/min by working the brake, and upset time 5 seconds. After pressure welding was carried out, the perpendicular degrees of the stud bolts were measured, and the measured values were all within 0.07 mm. Incidentally, these are extremely excellent mounting precision with respect to the arc stud welding in which the variation of about 1.6 mm is generated in the case where the stud bolt having the same length is used. Moreover, thermal deformation of the copper plate was scarcely observed. At 10 places, the sampling was randomly performed from the copper plate after the welding, and served as tensile test pieces. Then, the welding strengths were measured on such pieces to show strength of 450 MPa or more in all of the cases. It should be noted that all of the fracture points corresponded to "copper+SUS304", and an excellent interface welding state was indicated.

Three pieces of the test pieces were separately selected from the remaining portions which were not subjected to the test, and voids and non-welding portions were not observed at all in the observation of the welding portion from the cross section. Therefore, it could be verified that the friction welding could be fully employed in the manufacturing process of the casting mold.

INDUSTRIAL APPLICABILITY

For the conventional steel continuous casting mold, a copper plate which is unnecessarily thick has been utilized since there is a constraint that a back frame for water cooling is mounted. As a result of this, for the purpose of improving thermal conductivity, it has been essential to conduct such extra auxiliary working for providing a cooling groove on the side of the copper plate. On the other hand, according to the present invention, for example, an example of mold in which a mounting hole of a back frame is provided on the side of the casting mold, as shown in FIG. 5. If a boss made of stainless steel is subjected to friction welding, at least tread cutting processing to the rear surface of the mold and subsequent helisert attachment become unnecessary. Moreover, as ripple effects, not only the copper plate as a whole can be thinned but also the cutting processing of the cooling groove itself can be made unnecessary. It should be noted that in the case where it is more effective for uniform solidification of molten steel that the flow of the cooling water is rate-determined, the stock back frame can be versatile without remaking it in a novel fashion by making a plate having a cooling groove interposed between the mold rear surface and the back frame. Therefore, it leads to the significant reduction of industrial waste generated as a result of used copper material, furthermore, and also leads to the shortening of a large amount of processing time. Thus, the total economic effects thereby cannot be measured.

On the other hand, in a so-called bolt attached casting mold in which a stud bolt is welded by an arc stud welding method, it is possible that a stud bolt with flux of which tip has been bevel processed can be substituted with a usual stud bolt, and thus ferrule is not necessary, too. Therefore, the cost can be reduced, and there is no generation of the industrial waste, too. Furthermore, in addition to these, the heat affection to the mold copper plate is given only on the extreme surface layer, while void-free welding is achieved, and the heat deformation of casting mold after the welding, the lowering of the welding strength, and variation in the welding strength can be suppressed. Moreover, since inclination of a bolt (perpendicular degree) can be also prevented, there can be provided a casting mold and a method of manufacturing the same which can be made null of post-leveling processing and bolt breakage incident and the like and are extremely useful in the industries. Moreover, needless to say, the present invention can also be applied even the case where small members of any type of stainless steel or titanium member are welded.

Particularly, if the friction welding method is applied under the limited welding conditions, heat-affection which has an influence upon copper or a copper alloy can be localized in the extreme interface of the welding section, at the time when bolts for back frame mounting made of stainless steel or mounting seat are welded on the anti-molten steel contact surface of the casting mold, that is, on the contact surface (rear surface) with the cooling water, in a steel continuous casting. Thus, while heat deterioration, heat deformation, and further welding defects of copper or a copper alloy is prevented, the ripple effects make it possible to save a large scale of resources by integrating it in an excellent precision with a strong strength without assembling or trouble at the time when used.

The invention claimed is:

1. A method of manufacturing a mold welded to a dissimilar metal member, comprising:
   (i) a first step of pressingly bringing the dissimilar metal member into contact with a mold formed of copper or a copper alloy in a stationary state at a friction pressure of 60 MPa or more for 2 to 20 seconds while rotating the dissimilar metal member at a speed of 130 m/min or more,
   (ii) a second step of stopping the dissimilar metal member to a rotating speed of 0 (zero) m/min, and
   (iii) a third step of, after stopping rotating the dissimilar metal member, applying a forced pressure of 150 MPa or more for 5 to 30 seconds, the pressure of the third step being larger than the pressure of the first step to the mold, thereby welding the mold to the dissimilar metal member.

2. The method according to claim 1, wherein the mold is used to continuously cast steel.

3. The method according to claim 2, wherein the mold is a continuous casting mold for electromagnetic stirring.

4. The method according to claim 2, wherein the dissimilar metal member is a back frame mounting member.

5. The method according to claim 4, wherein the back frame mounting member is equipped with a screw structure for interiorly mounting the back frame.

6. The method according to claim 2, wherein the dissimilar metal member comprises stainless steel, titanium, titanium alloy or nickel alloy.

7. The method according to claim 2, wherein when the mold and the dissimilar metal member are brought into contact with each other and a nickel plating layer, a nickel alloy plating layer, a nickel foil, or a nickel alloy foil is intervened between the mold surface and the dissimilar metal member surface.

8. The method according to claim 7, wherein the thickness of the plating layer or the foil is in the range from 1 to 50 μm.

9. The method according to claim 1, wherein the dissimilar metal member is a back frame mounting member.

10. The method according to claim 9, wherein the back frame mounting member is equipped with a screw structure for interiorly mounting the back frame.

11. The method according to claim 1, wherein the dissimilar metal member comprises stainless steel, titanium, titanium alloy or nickel alloy.

12. The method according to claim 1, wherein when the mold and the dissimilar metal member are brought into contact with each other and a nickel plating layer, a nickel alloy plating layer, a nickel foil, or a nickel alloy foil is intervened between the mold surface and the dissimilar metal member surface.

13. The method according to claim 12, wherein the thickness of the plating layer or the foil is in the range from 1 to 50 μm.

* * * * *